US010040498B2

(12) United States Patent
Sun et al.

(10) Patent No.: US 10,040,498 B2
(45) Date of Patent: Aug. 7, 2018

(54) MULTI-DIAMETER CLAMP FOR CLAMPING ON TIRES OF DIFFERENT SIZES

(71) Applicant: INDUSTRIAL TECHNOLOGY RESEARCH INSTITUTE, Hsinchu (TW)

(72) Inventors: Yuan-Heng Sun, New Taipei (TW); Kang-Feng Lee, Taipei (TW); Yuan-Ann Chang, Taoyuan County (TW); Meng-Ru Lin, New Taipei (TW); Ruey-Liang Ma, Kaohsiung (TW); Jen-Yu Yu, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 14/581,086

(22) Filed: Dec. 23, 2014

(65) Prior Publication Data

US 2016/0176304 A1 Jun. 23, 2016

(51) Int. Cl.
*B62H 5/14* (2006.01)
*B60L 11/18* (2006.01)
*B62H 3/08* (2006.01)
*B60R 25/09* (2013.01)
(Continued)

(52) U.S. Cl.
CPC ............ *B62H 5/141* (2013.01); *B60L 11/182* (2013.01); *B60L 11/1818* (2013.01);
(Continued)

(58) Field of Classification Search
CPC .............. B60L 11/1816; B60L 11/1818; B60L 11/182; B60L 2230/10; B62H 3/04;
(Continued)

(56) References Cited

U.S. PATENT DOCUMENTS 5,278,538 A 1/1994 Ainsworth et al.
5,917,407 A 6/1999 Squire et al.
(Continued)

FOREIGN PATENT DOCUMENTS

CN 101492076 B 9/2010
CN 203003537 U 6/2013
(Continued)

OTHER PUBLICATIONS

STIC search report, May 9, 2017.*
Taiwan Patent Office, Office Action, Patent Application No. TW103146503, dated Mar. 24, 2016, Taiwan.

*Primary Examiner* — Richard Isla Rodas
*Assistant Examiner* — Manuel Hernandez
(74) *Attorney, Agent, or Firm* — JCIPRNET

(57) ABSTRACT

A multi-diameter clamp for clamping on tires of different sizes is provided. The multi-diameter clamp comprises at least one clamping unit, at least one actuator, and at least one sensing unit. The at least one clamping unit further includes at least one movable member and a fixed member. Wherein the at least one movable member moves within a tire housing space having a starting position and a clamping position. The tire housing space locates between the movable member and the fixed member for clamping on a tire. The at least one actuator connects to the at least one movable member, and enables the at least one moveable member to move between the starting position and the clamping position. The at least a sensing unit obtains a diameter size of the tire, and based on the diameter size, actuates the at least one actuator corresponding to the diameter size.

11 Claims, 9 Drawing Sheets

(51) Int. Cl.
*B62H 3/04* (2006.01)
*B62H 3/00* (2006.01)
*B62H 3/06* (2006.01)
*B60R 9/10* (2006.01)

(52) U.S. Cl.
CPC ............ *B60R 25/09* (2013.01); *B60R 25/093* (2013.01); *B62H 3/00* (2013.01); *B62H 3/04* (2013.01); *B62H 3/08* (2013.01); *B62H 5/14* (2013.01); *B62H 5/142* (2013.01); *B62H 5/144* (2013.01); *B62H 5/148* (2013.01); *B60L 2230/10* (2013.01); *B60R 9/10* (2013.01); *B62H 3/06* (2013.01); *B62H 2003/005* (2013.01); *Y02T 10/7005* (2013.01); *Y02T 10/7088* (2013.01); *Y02T 90/122* (2013.01); *Y02T 90/14* (2013.01)

(58) Field of Classification Search
CPC ...... B62H 3/08; B62H 2003/005; B62H 5/14; B62H 5/141; B62H 5/142; B62H 5/144; B62H 5/148; B62H 3/06; B60R 25/09; B60R 25/093; B60R 9/10
USPC ......... 320/108; 211/19, 20; 70/19, 225, 226, 70/237, 258–260
See application file for complete search history.

(56) References Cited

U.S. PATENT DOCUMENTS

| | | | |
|---|---|---|---|
| 7,898,439 B2 | 3/2011 | Bettez et al. | |
| 2006/0108297 A1* | 5/2006 | Gay | B62H 3/04 211/20 |
| 2007/0239465 A1 | 10/2007 | Le Gars | |
| 2009/0240575 A1* | 9/2009 | Bettez | B62H 3/00 705/13 |
| 2010/0051206 A1* | 3/2010 | Lawson | B60C 25/0515 157/1.17 |
| 2012/0196631 A1 | 8/2012 | Axelsen | |
| 2014/0115906 A1* | 5/2014 | Pruitt | G01B 5/255 33/203.18 |

FOREIGN PATENT DOCUMENTS

| | | | |
|---|---|---|---|
| EP | 2261108 A2 | | 12/2010 |
| JP | 2006021617 A | | 1/2006 |
| JP | 2006056396 A | * | 3/2006 |
| JP | 2007015507 A | | 1/2007 |
| JP | 2013180748 A | * | 9/2013 |
| JP | 2013224124 A | * | 10/2013 |
| JP | 2014080172 A | * | 5/2014 |
| JP | 2014173367 A | | 9/2014 |
| TW | 213164 | | 9/1993 |
| TW | 293332 | | 12/1999 |
| TW | 376213 | | 12/1999 |
| TW | 590143 U | | 6/2004 |
| TW | M376479 U | | 3/2010 |
| TW | M400433 | | 3/2011 |
| TW | M400433 U | | 3/2011 |
| TW | M412907 U | | 10/2011 |
| TW | M448421 U | | 3/2013 |
| TW | M456316 U | | 7/2013 |
| TW | M479883 U | | 6/2014 |
| TW | M501979 U | | 6/2015 |

* cited by examiner

MULTI-DIAMETER CLAMP FOR CLAMPING ON TIRES OF DIFFERENT SIZES

TECHNICAL FIELD

The technical field generally relates to a multi-diameter clamp for clamping on tires of different sizes.

BACKGROUND

Riding a bike may reduce the emission of carbon dioxide and some headache issues of environmental protection. Therefore, it becomes a popular activity for the people. During the holidays, many riders enjoy the fun of riding a bike. Except of riding a personal bike, it is also popular for the people to rent a bike. There are various sizes of tires for the rental bikes to meet various needs of bike renters. Accordingly, the clamping means for these rental bikes may conduct an update or new device elements may be added thereon. However, this may increase the cost. When a clamping means is suitable for bike tires of various sizes, it would bring positive benefits for the bike renters.

The features of an electric motor vehicle or bike may include no exhaust emission. Nowadays many people choose electric motor vehicles as the means of transportation for a short distance. Using electric motor vehicles as the means of transportation has been carried out in many cities to reduce the emission of carbon dioxide and protect the environment. However, insufficient charging stations for the electric motor vehicles or bikes may cause the people having no interest in using the electric motor vehicles or bikes as the transportation means.

Currently, the clamping devices of bikes are customized, for example, restrictions on the tire dimensions. Such clamping devices are all designed as a single size but for general bike tires. Thus, said such clamping devices cannot be used by the bikes having other sizes, let alone the electric motor vehicles. Therefore, for those cities without a sufficient public space, how to optimize the public spaces that provide the transportation means and facility environment has become an important issue.

It may bring a great advantage when there is a clamping device that can provide the fixing function to facilitate the use of both the electric motor vehicles and bikes. Furthermore, the services using such facility to provide recharge, not only create the convenient environment for users but also reduce the cost of building the charging stations and the number of the charging stations thereof.

SUMMARY

Accordingly, the present disclosure is directed to a multi-diameter clamp.

An exemplary embodiment relates to a multi-diameter clamp for clamping on tires of different sizes. The multi-diameter clamp comprises at least one clamping unit, at least one actuator, and at least one sensing unit. The at least one clamping unit includes at least one movable member and a fixed member. Wherein the at least one movable member moves within a tire housing space having a starting position and a clamping position. The tire housing space locates between the movable member and the fixed member for clamping on a tire. The at least one actuator connects to the at least one movable member, and enables the at least one moveable member to move between the starting position and the clamping position. The at least a sensing unit obtains a diameter size of the tire, and based on the diameter size, actuates the at least one actuator corresponding to the diameter size.

The foregoing will become better understood from a careful reading of a detailed description provided herein below with appropriate reference to the accompanying drawings.

DETAILED DESCRIPTION OF THE DISCLOSED EMBODIMENTS

Figure 1:
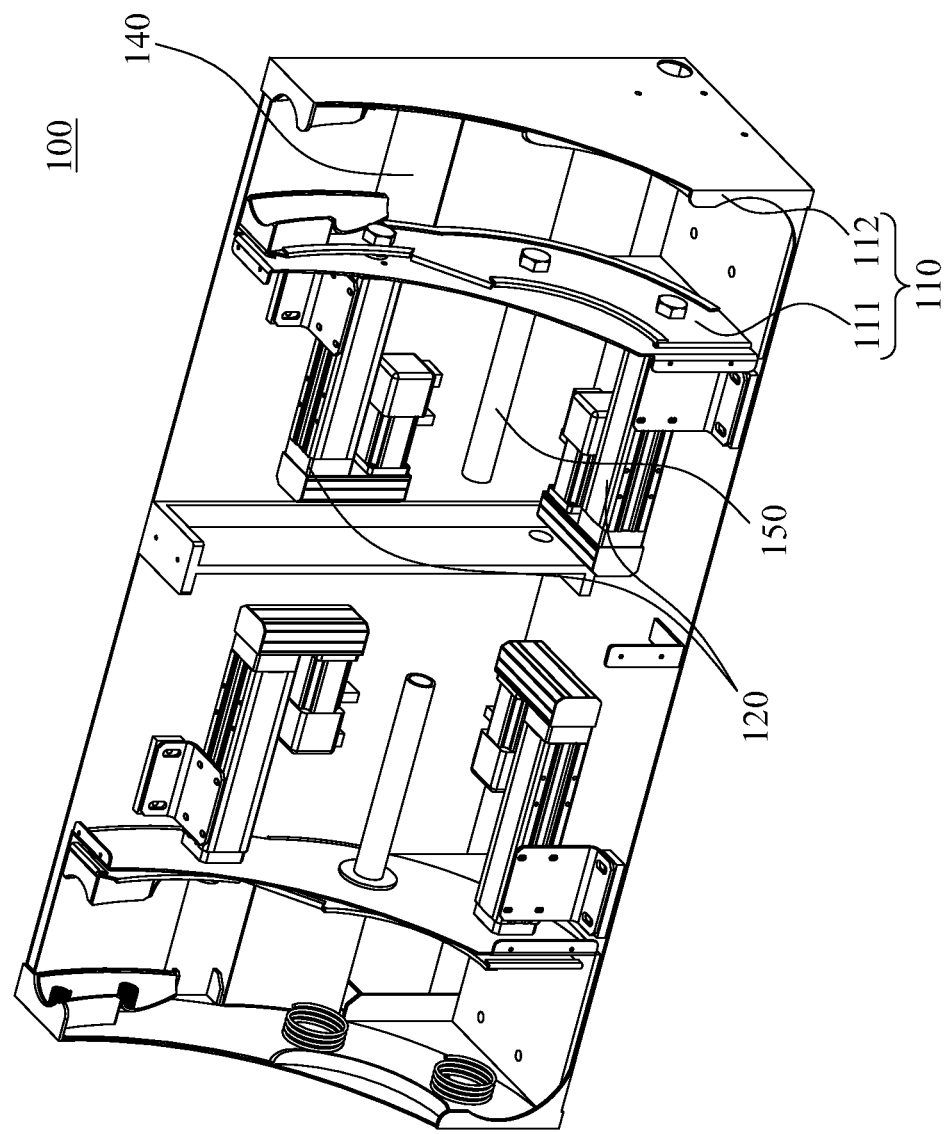
FIG. 1 shows a multi-diameter clamp, according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the exemplary embodiments in the disclosure, a multi-diameter clamp is provided. The multi-diameter clamp may be applicable to the tires of various tire sizes for a bike, an electric motor vehicle and an electric bike. The multi-diameter clamp may be applicable to a rental system, and to facilitate the use of a bike, an electric bike or an electric motor vehicle and may also provide a charging service for the electric motor vehicle and the electric bike.

FIG. 1 shows a multi-diameter clamp, according to an exemplary embodiment of the disclosure. As shown in FIG. 1, a multi-diameter clamp 100 comprises at least one clamping unit 110, at least one actuator 120, and at least one sensing unit (not shown in the FIG. 1). The at least one clamping unit 110 includes at least one movable member 111 and a fixed member 112. The at least one movable member 111 moves within a tire housing space 140 having a starting position and a clamping position. The tire housing space 140 locates between the movable member 111 and the fixed member 112 for clamping on a tire. The at least one actuator 120 connects to the at least one movable member 111, and enables the at least one moveable member 111 to move between the starting position and the clamping position. The at least one sensing unit obtains a diameter size of a tire, and based on the diameter size, actuates the at least one actuator 120 corresponding to the diameter size. The multi-diameter clamp 100 may further include at least one linear guide 150 connected to the movable member 111. The at least one linear guide 150 and the at least one actuator 120 are disposed in parallel, to provide the stability for the at least one movable member 111 when moving. The movable member may be a longitudinal panel. The actuator may be, but not limited to an electric cylinder, a solenoid, a pneumatic actuator or a hydraulic actuator, to actuate the at least one movable member.

Figure 2A:
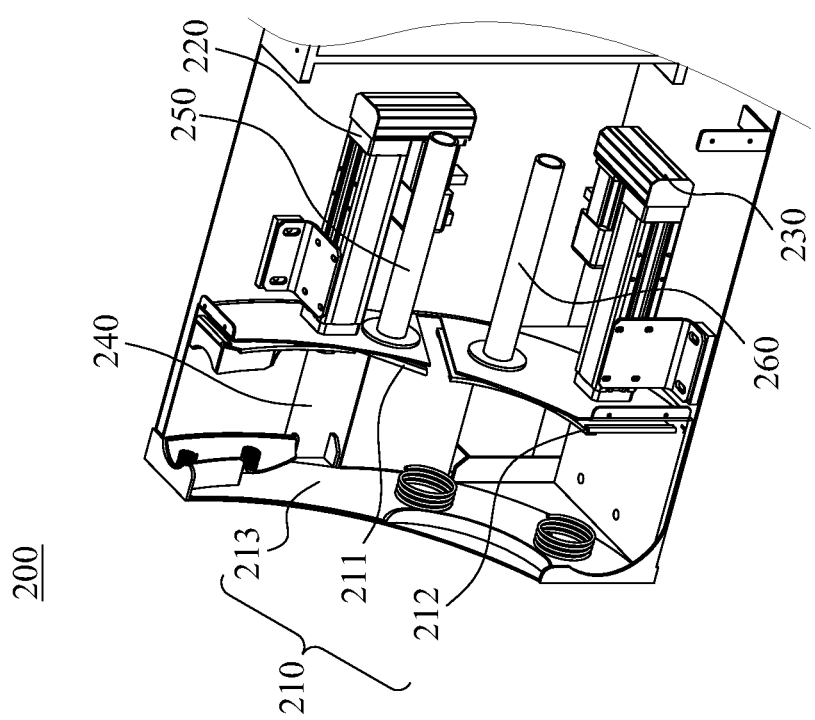
FIG. 2A shows two movable members and two actuators, according to an exemplary embodiment of the disclosure.

FIG. 2A shows two movable members and two actuators, according to an exemplary embodiment of the disclosure. As shown in FIG. 2A, an exemplary multi-diameter clamp 200 includes a clamping unit 210, a first actuator 220, a second actuator 230, and at least one sensing unit 240 (not shown in FIG. 2A). The clamping unit 210 further includes a first movable member 211, a second movable member 212, and a fixing member 213, wherein the first movable member 211 and the second movable member 212 move within a tire housing space 240 having a starting position and a clamping position. The tire housing space 240 locates between the first or the second movable member and the fixed member 213 for clamping on a tire. The first actuator 220 and the second actuator 230 connect to the first movable member 211 and the second movable member 212, respectively, and enable the first movable member 211 and the second movable member 212, respectively, to move between the starting position and the clamping position. The at least one sensing unit obtains a diameter size of the tire, and based on the diameter size, actuates the first actuator 220 or the second actuator 230 corresponding to the diameter size.

Wherein the first movable member 211, the second moveable member 212 and the fixed member 213 are disposed in parallel and extend annularly along a same extending direction, and the first movable member 211, the second moveable member 212 and the fixed member 213 each have a radius of curvature substantially matching a radius of curvature of a peripheral portion of the tire. Wherein the first movable member 211 and the first actuator 220 may be applied to the tires of a large diameter, such as bike tires. Therefore, when the first actuator 220 towards the fixed member 213, and pushes the first movable member 211 from the start position toward the clamping position, the bike tire is tightly clamped between the fixed member 213 and the first movable member 211. The second movable member 212 and second actuator 230 may be applied to the tires of a small diameter, such as tires of electric motor vehicle or electric bike or bicycle, when the second actuator 230 pushes the second movable member 212 from the starting position toward the clamping position, the tire of an electric motor vehicle or an electric bike or a bicycle is tightly clamped between the fixed member 213 and the second movable member 212.

The multi-diameter clamp 200 may further include a first linear guide 250 and a second linear guide 260. The first linear guide 250 and the second linear guide 260 connect to the first movable member 211 and the second movable member 212, respectively, and are disposed in parallel with the first actuator 220 and the second actuator 230, respectively.

Figure 2C:
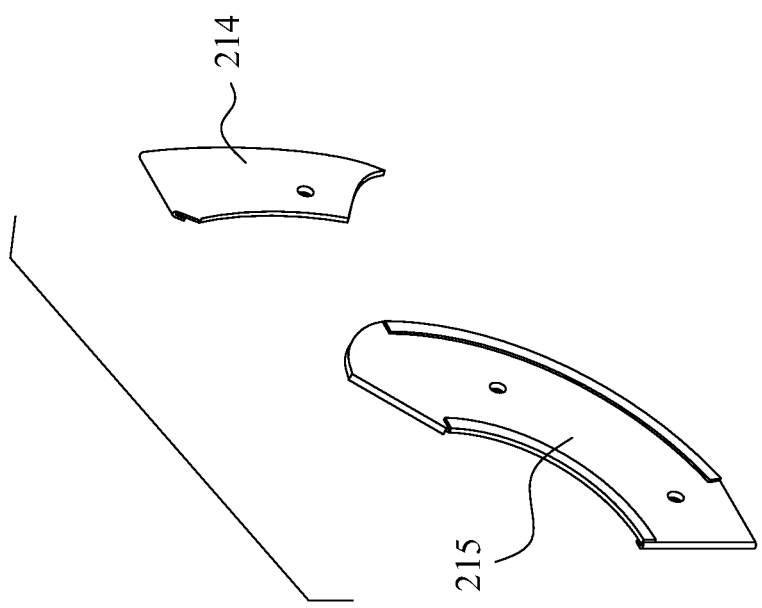
FIG. 2B and FIG. 2C show schematic views of two movable members of different sizes operate with two drive cylinders, respectively, according to another exemplary embodiment of the disclosure.
Figure 2B:
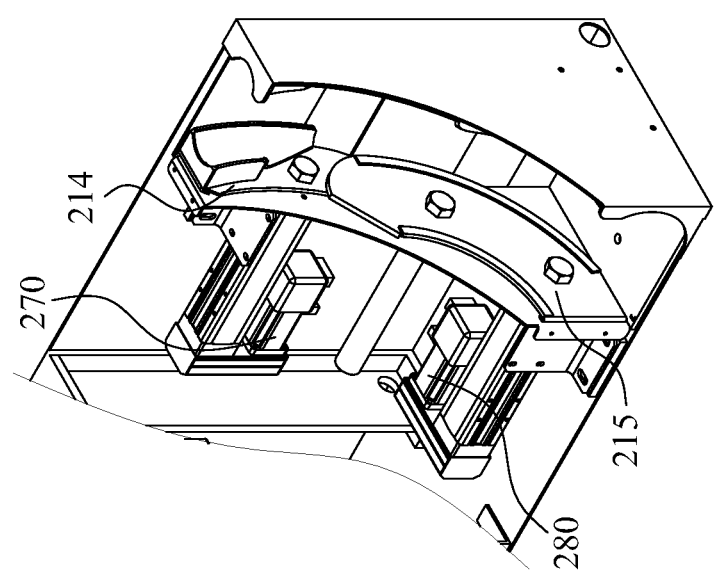

FIG. 2B and FIG. 2C show schematic views of two movable members of different sizes operate with two drive cylinders, respectively, according to another exemplary embodiment of the disclosure. Referring to FIG. 2B and FIG. 2C, a first drive cylinder 270 and a second drive cylinder 280 push a first-size movable member 214 and a second-size movable member 215, respectively. Wherein, when the first-size drive cylinder 270 pushes the first-size movable member 214, it clamps a first diameter-size tire, such as a bike tire (a tire of a large diameter). When the second-size drive cylinder 280 pushes the second-size movable member 215, it clamps a second diameter-size tire, such as a tire of an electric motor bike (a tire of a small diameter).

Figure 3:
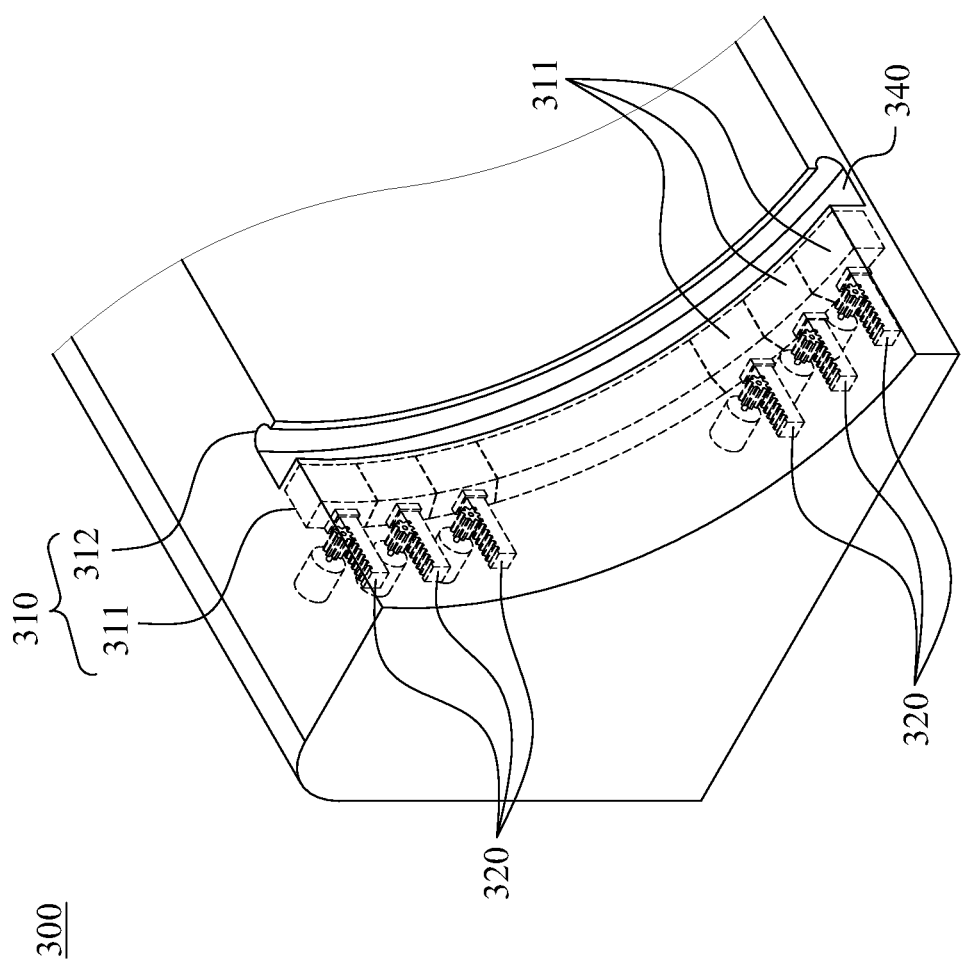
FIG. 3 is a schematic view showing a plurality of movable members of different sizes operate with a plurality of actuators, according to another exemplary embodiment of the disclosure.

FIG. 3 is a schematic view showing a plurality of movable members of different sizes operate with a plurality of actuators, according to another exemplary embodiment of the disclosure. As shown in FIG. 3, an exemplary multiple 300 comprises a clamping unit 310, a plurality of actuators 320, and at least one sensing unit (not shown in FIG. 3). The clamping unit 310 further includes a plurality of the movable members 311 and a fixing member 312. The plurality of the movable members 311 move within a tire housing space 340 having a start position and a clamping position, for clamping on a tire in the tire housing space 340. The tire housing space 340 locates between the fixing member 312 and the plurality of the movable members 311. The plurality of the movable members 311 and the fixed member 312 are disposed in parallel and extend annularly along a same extending direction, and the plurality of the moveable members 311 and the fixed members 312 each have a radius of curvature substantially matching a radius of curvature of a peripheral portion of the tire. The plurality of actuators 320 connect to the plurality of the movable member 311, respectively, to enable the plurality of movable members to move between the start position and the clamping position. The at least one sensing unit obtains a diameter size of the tire, and based on the diameter size, actuates a pair of corresponding actuators of the plurality of actuators 320. Wherein each of the plurality of movable members 311 may be, but not limited to a horizontal plate, and the actuator may further include at least one motor and at least one rack.

Figure 4A:
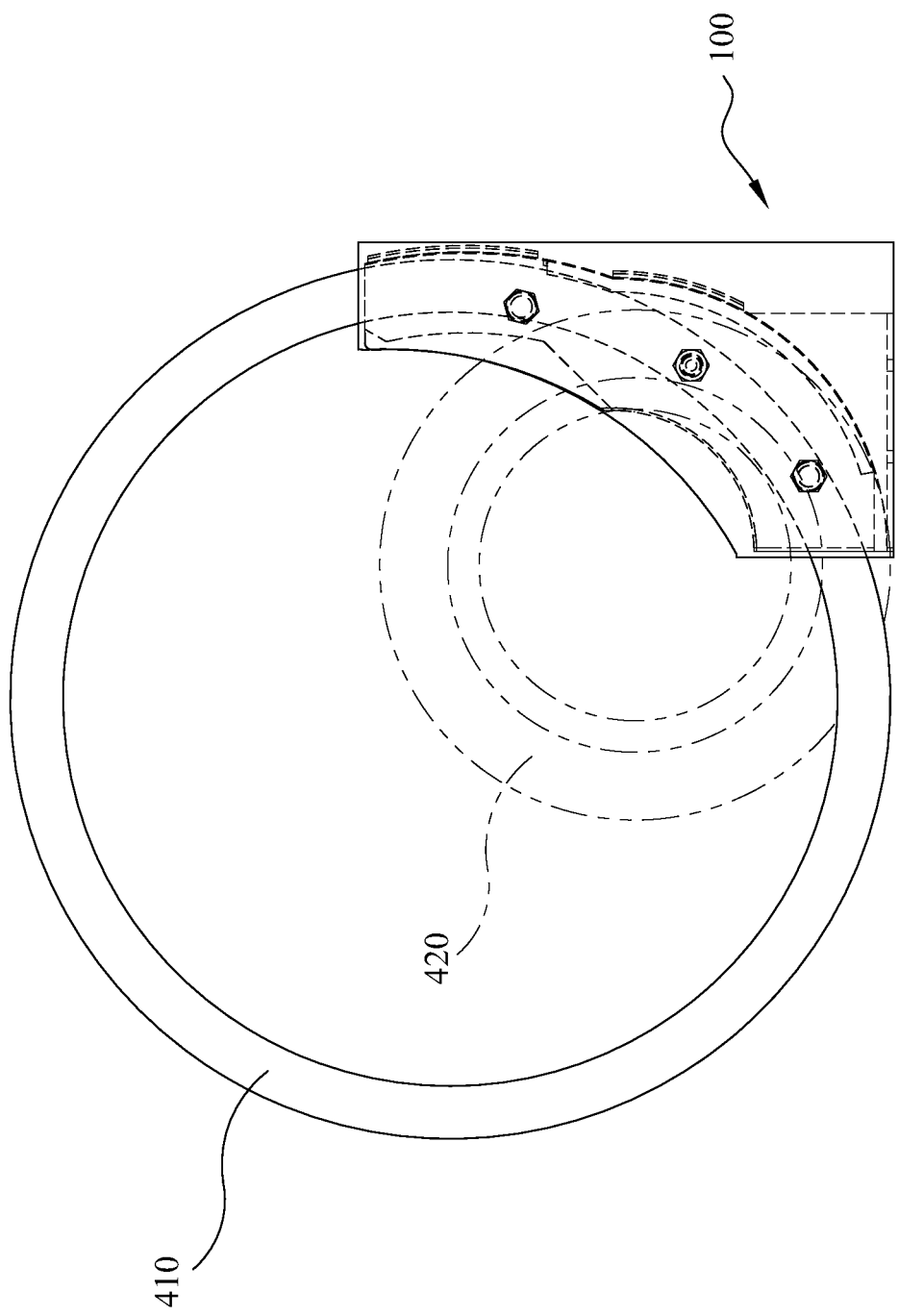
FIG. 4A is a schematic view showing the relative clamping position between the multi-diameter clamp and a tire of a different size, according to an exemplary embodiment of the disclosure.

FIG. 4A is a schematic view showing the relative clamping position between the multi-diameter clamp and a tire of a different size, according to an exemplary embodiment of the disclosure. FIG. 4A illustrates a side view of the multi-diameter clamp 100, a bike tire 410 and a tire of an electric motor vehicle 420, which indicates the multi-diameter clamp 100 may clamp a tire of a different size at a different clamping position. The more detailed about how to determine the clamping position will be illustrated in FIG. 5.

Figure 4B:
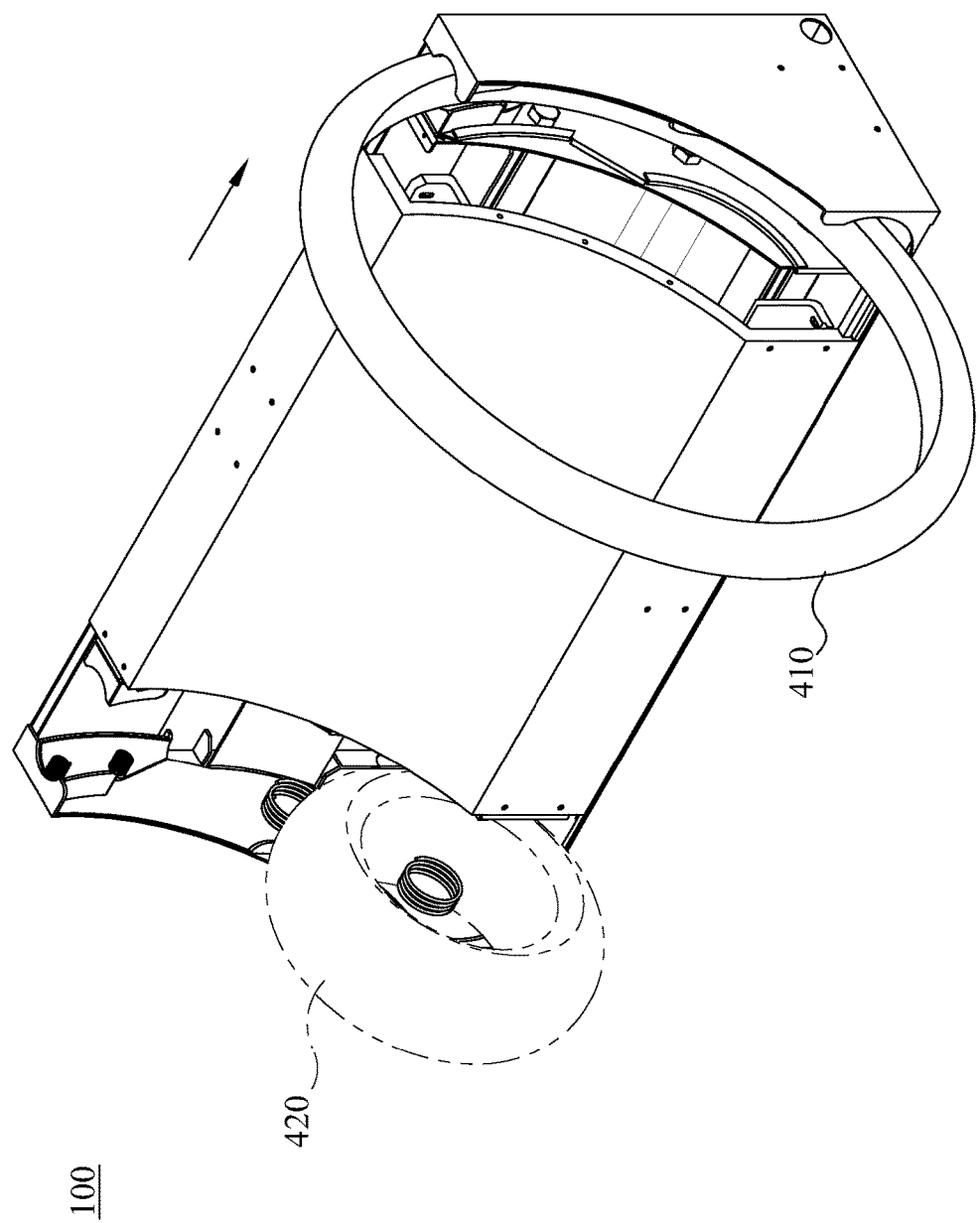
FIG. 4B is a schematic view showing the relationship between the multi-diameter clamp and tires of different sizes, according to another exemplary embodiment of the disclosure.

FIG. 4B is a schematic view showing a perspective view of the multi-diameter clamp 100, the bike tire 410 and the tire of the electric motor vehicle 420, according to another exemplary embodiment of the disclosure. As shown in FIG. 4B, there may be two clamping units in the multi-diameter clamp 100, wherein the bike tire 410 and the tire of the electric motor vehicle 420 may be clamped and placed in a corresponding tire housing space 140, respectively.

Figure 5:
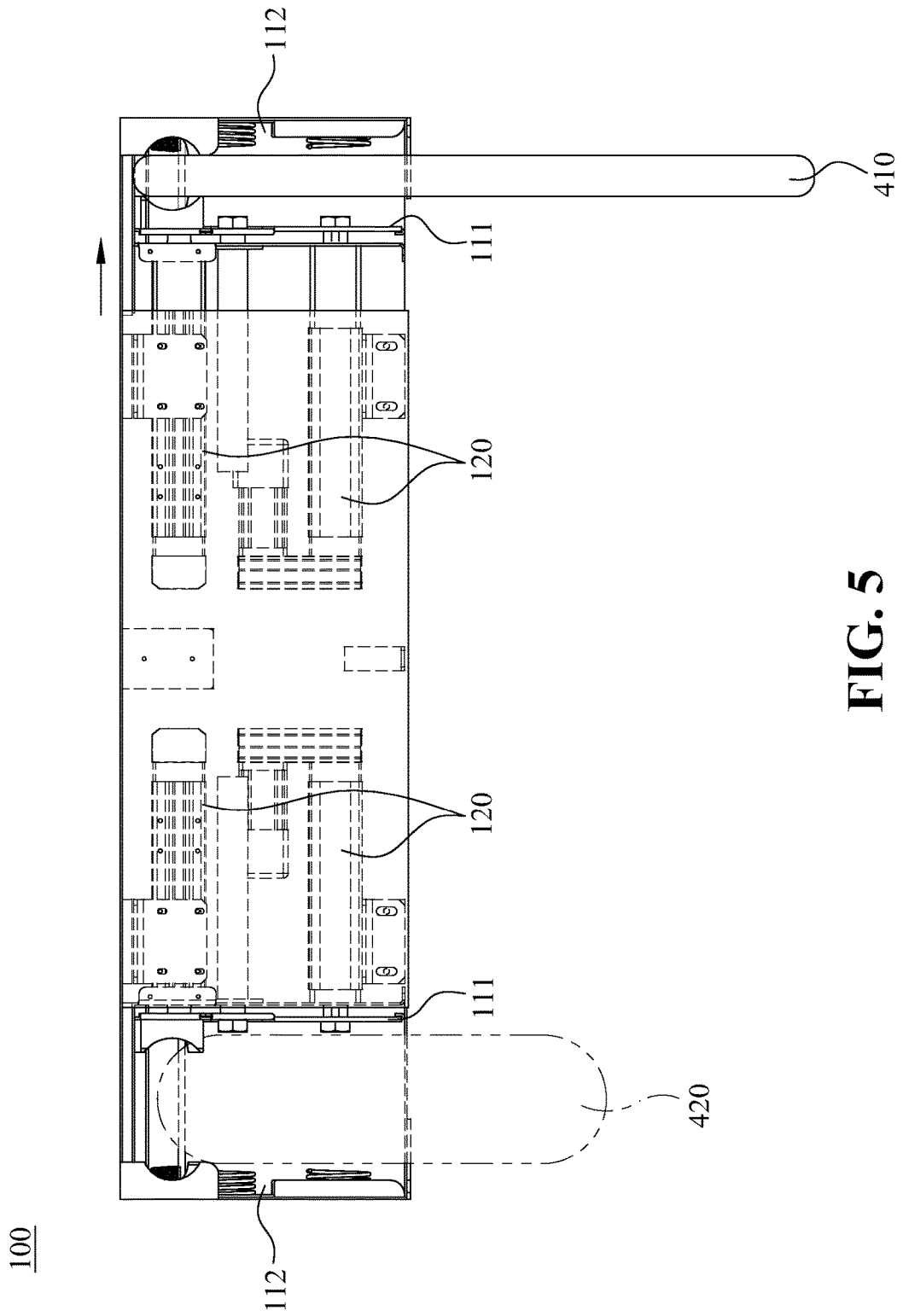
FIG. 5 is a schematic view showing how to clamp a tire of such as a bike tire 410 or a tire of an electric motor vehicle 420, and determine the clamping position of the tire by the multi-diameter clamp, according to an exemplary embodiment of the disclosure.

FIG. 5 is a schematic view showing how to clamp a tire of such as a bike tire 410 or a tire of an electric motor vehicle 420, and determine the clamping position of the tire by the multi-diameter clamp, according to an exemplary embodiment of the disclosure. FIG. 5 illustrates a top view of the multi-diameter clamp 100, the bike wheel 410 and the tire of an electric motor vehicle 420. When the sensing unit (not shown in the FIG. 5) obtain a diameter size of the tire, based on the diameter size, the sensing unit actuate the at least one actuator 120. The at least one actuator 120 then pushes the at least one movable member 111 to move from a starting position toward the fixed member 112, and stops at a clamping position. In other words, the tire is tightly clamped at the clamping position via the movable member 111 and the fixing member 112.

Figure 6:
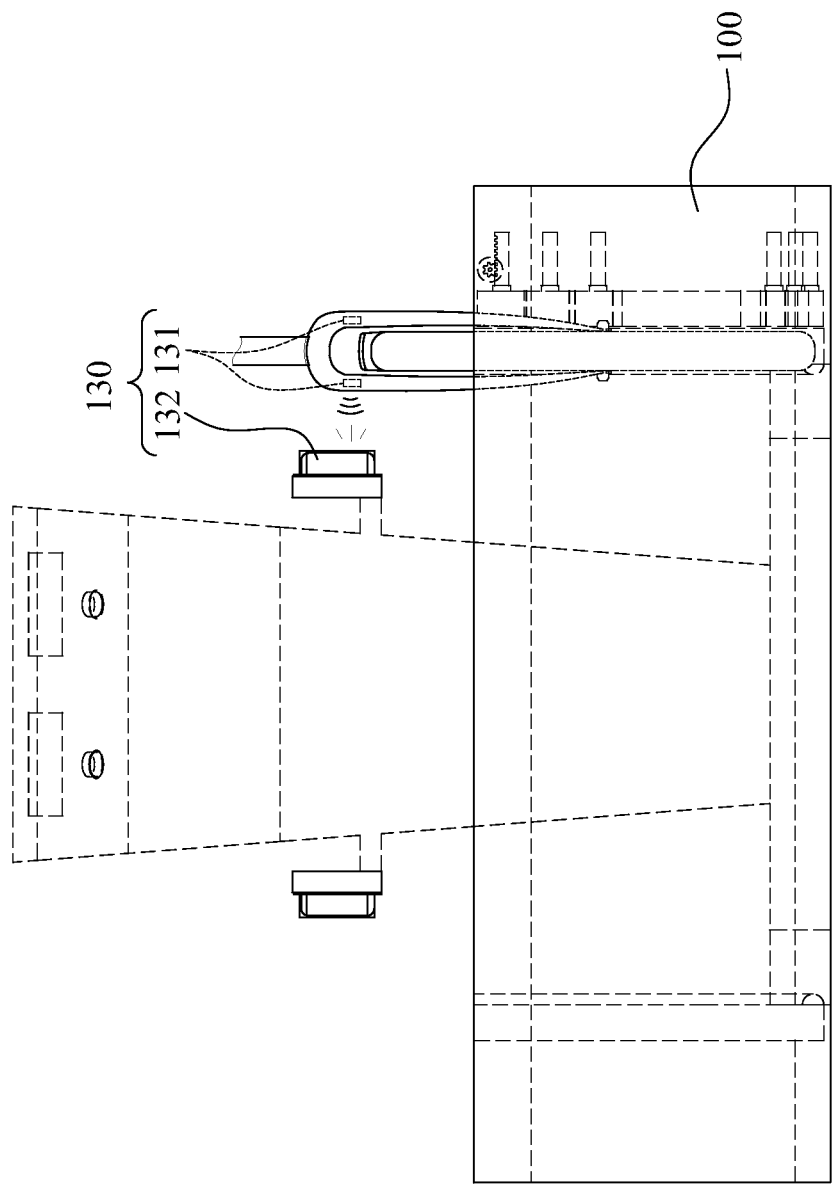
FIG. 6 is a schematic view showing how to configure at least one sensing unit, according to an exemplary embodiment of the disclosure.

FIG. 6 is a schematic view showing how to configure at least one sensing unit, according to an exemplary embodiment of the disclosure. The at least one sensing unit may include a sensing tag or a sensor. As shown in FIG. 6, a sensing tag 131 is placed on a specific location of such as a bike or an electric motor vehicle or an electric bicycle. A sensor 132 is placed on the multi-diameter clamp 100. The sensing tag 131 contains at least one diameter size. When the sensing tag 131 locates within a sensing range of the sensor 132, the diameter size contained in the sensing tag 131 may be obtained by the sensor 132.

Figure 7:
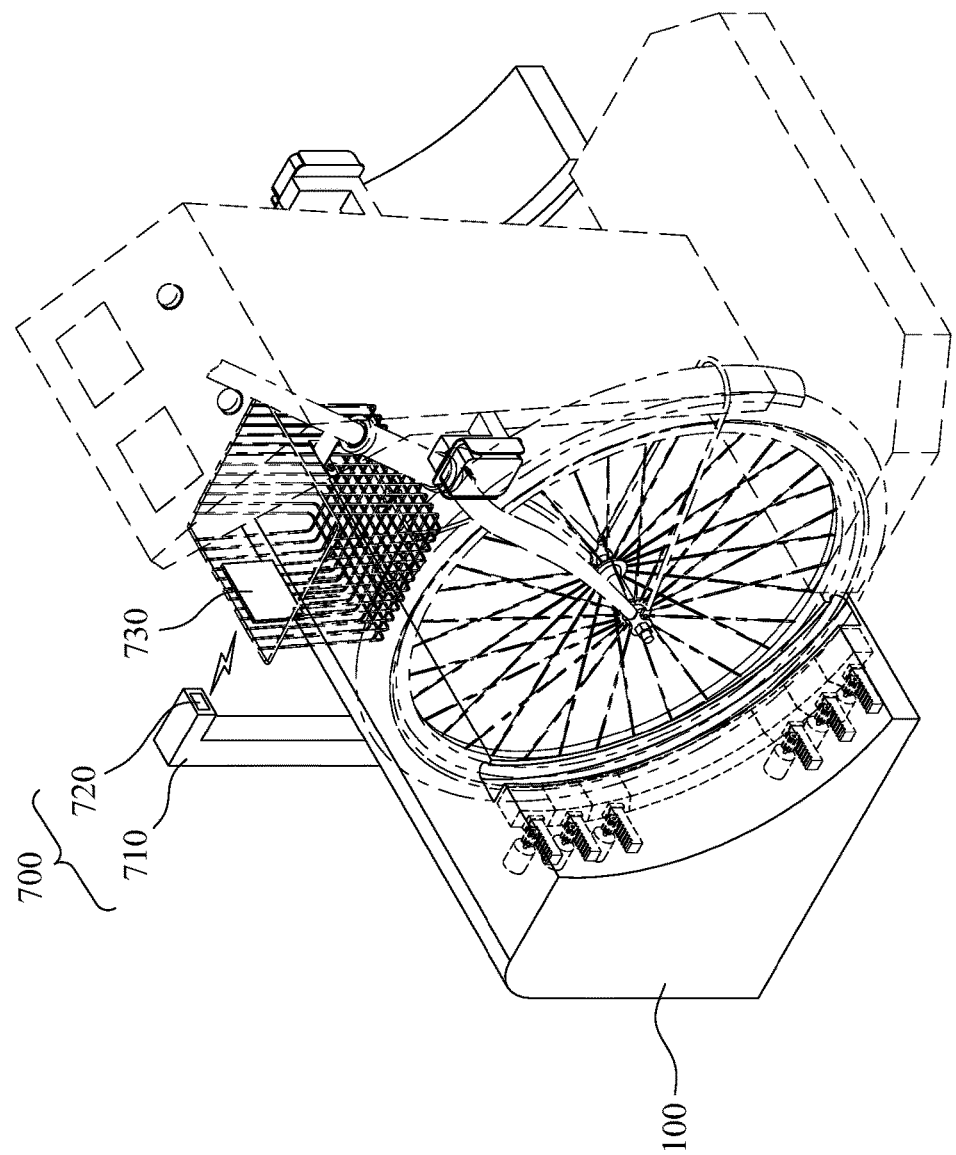
FIG. 7 is a schematic view showing an exemplary configuration of the wireless charging unit, according to an exemplary embodiment of the disclosure.

The multi-diameter clamp may further include a charging unit. The charging unit may be a wired charging unit or a wireless charging unit. The wired charging unit may further include a charging gun and a charging dock. The wireless charging unit may further include a charging output terminal and a charging receiving terminal. FIG. 7 is a schematic view showing an exemplary configuration of the wireless charging unit, according to an exemplary embodiment of the disclosure. As shown in FIG. 7, the wireless charging unit 700 is set on the multi-diameter clamp 100. The wireless charging unit 700 may further include a charging column 710 and a charging output terminal 720. The charging output terminal 720 is disposed in an upper portion of the charging column 710. The charging receiving terminal 730 and the charging output terminal 720 of such as a bike or an electric motor vehicle, or an electric bike are set in a mutual corresponding manner, so that when the charge receiving terminal 730 is placed in a position corresponding to that of the charging output terminal 720, the charge output terminal 720 can continue to provide electricity to the charge receiving terminal 730. The charging output terminal 720 and the charging receiving terminal 730 may be, but not limited to a power output induction coil and a power receiving induction coil, respectively. The charging column of the wireless charging unit 700 may be placed in anywhere of the multiple-diameter clamp. In other words, as long as the charging receiving terminal of the bike or the electric motor vehicle or the electric bike, and the charging output terminal of the charging column are set in a mutual corresponding manner, it can be achieved to complete the power transmission. Therefore, there are other exemplary embodiments to implement the power transmission for the multi-diameter clamp, but not limited to the exemplary embodiment of the FIG. 7.

In summary, according to the exemplary embodiments of the disclosure, a multi-diameter clamp is provided. The multi-diameter clamp can be applicable to the tires of various tire sizes for a bike, an electric motor vehicle and an electric bike. The multi-diameter clamp may also provide a charging service for the electric motor vehicle and the electric bike. According to the above exemplary embodiments, the cost of building the charging stations and the number of the charging stations are also reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-diameter clamp for clamping on tires of different sizes, comprising:
    at least one clamping unit including a plurality of movable members and a fixed member, wherein the plurality of movable members move within a tire housing space having a starting position and a clamping position, and the tire housing space is located between at least one of the plurality of movable members and the fixed member for clamping on a tire, wherein the plurality of movable members and the fixing member are disposed in parallel and extend annularly along a same extending direction, and the movable members and the fixing member each have a radius of curvature substantially matching a radius of curvature of a peripheral portion of the tire;
    a plurality of actuators that connect to the plurality of movable members, and enable the plurality of movable members to move between the starting position and the clamping position; and
    at least one sensing unit that obtains a diameter size of the tire, and based on the diameter size, actuates one of the actuators of the plurality of actuators corresponding to the diameter size.

2. The multi-diameter clamp as claimed in claim 1, wherein at least one of the plurality of movable members is a longitudinal panel.

3. The multi-diameter clamp as claimed in claim 1, wherein the multi-diameter clamp further includes at least one linear guide connected to at least one of the plurality of movable members, and the at least one linear guide and the plurality of actuators are disposed in parallel.

4. The multi-diameter clamp as claimed in claim 1, wherein the at least one sensing unit includes a sensing tag.

5. The multi-diameter clamp as claimed in claim 1, wherein the at least one sensing unit includes a sensor.

6. The multi-diameter clamp as claimed in claim 1, wherein at least one of the plurality of actuators is an electric cylinder, a solenoid, a pneumatic actuator or a hydraulic actuator, to actuate at least one of the plurality of movable members.

7. The multi-diameter clamp as claimed in claim 1, wherein the multi-diameter clamp further includes a charging unit.

8. The multi-diameter clamp as claimed in claim 7, wherein the charging unit is a wired charging unit or a wireless charging unit.

9. The multi-diameter clamp as claimed in claim 8, wherein the wired charging unit further includes a charging gun and a charging dock.

10. The multi-diameter clamp as claimed in claim 8, wherein the wireless charging unit further includes a charging output terminal and a charging receiving terminal, and the charging output terminal is a power output induction coil.

11. The multi-diameter clamp as claimed in claim 1, wherein the tire is one of a bike tire, a tire of an electric motor vehicle, or a tire of an electric bicycle.

* * * * *